United States Patent [19]
Bryntse

[11] 3,814,456
[45] June 4, 1974

[54] FORK LIFT TRUCK

[75] Inventor: Anders Ivar Bryntse, Mjolby, Sweden

[73] Assignee: AB Bygg-och Transportekonomi (BT), Bromma, Sweden

[22] Filed: Nov. 17, 1972

[21] Appl. No.: 307,388

[52] U.S. Cl. ........................ 280/43.12, 403/161
[51] Int. Cl. ................................... B62D 21/18
[58] Field of Search ...... 280/43.12; 254/2; 403/161, 403/120

[56] References Cited
UNITED STATES PATENTS

| | | | |
|---|---|---|---|
| 3,026,089 | 3/1962 | Meister | 280/43.12 |
| 3,202,233 | 8/1965 | Dolphin | 280/43.12 |
| 3,246,713 | 4/1966 | Nichols | 280/43.12 |
| 3,261,617 | 7/1966 | Becker | 280/43.12 |
| 3,567,240 | 3/1971 | Brassington | 280/43.12 |

*Primary Examiner*—Robert R. Song
*Attorney, Agent, or Firm*—Flynn & Frishauf

[57] ABSTRACT

In a height-adjustable fork lift truck, or the like, having a forwardly projecting portion supported on rolling means, means is provided for selectively raising and lowering the forwardly projecting portion of the truck relative to the rolling means, the raising and lowering means including a fork arm carrying a rolling means and being pivotally connected to the forwardly projecting portion of the frame. A motion-transmitting mechanism is coupled to the frame and is pivotally connected to the fork arm via a second pivot means in order to impart rotation to the fork arm in a direction dependent upon the direction of motion of the frame of the truck relative to its support wheels in order to thereby correspondingly lift or lower the forwardly projecting portion of the frame. Each of the pivot means connecting the fork arm to the forwardly projecting portion and to the motion-transmitting mechanism comprises respective multiple-shear pivot junctions in order to improve the structural strength characteristics of the truck.

9 Claims, 6 Drawing Figures

PATENTED JUN 4 1974 3,814,456

FORK LIFT TRUCK

This invention relates to improvements in elevating trucks, such as pallet trucks and stackers.

Such elevating trucks generally comprise a movable body portion on wheels and an upwardly movable frame which at its lower part is rigidly secured to the body portion by means of forwardly projecting legs. The legs generally carry support rollers in fork arms formed at the forward ends thereof. The fork arms are pivoted in the forwardly projecting legs via a first shaft and movably connected via a second shaft to the body portion and frame. A coupled motion-transmitting mechanism is arranged to operate upon the fork arms dependent upon the upward and downward motion of the frame in order to thereby lift or lower the legs relative to the bed of the truck.

The present invention can be used on hand operated and powered pallet trucks, where the rollers are mounted in bearings directly on the lift forks and also on stackers where the rollers are mounted in bearings on elevating support arms. The stackers are provided with separate lift forks, which in their lowest position rest on the support arms or are stopped in their immediate vicinity.

In earlier known trucks of the above mentioned type, each fork arm is pivotally connected to the respective legs by means of a shaft which at both ends is supported in fastening devices which are directly attached to the sides of the lift forks. Such an arrangement has proved to be unsatisfactory, especially in such trucks where the legs must move to an extremely low position in order to be brought under a very low pallet. The lower the height of the legs, the less becomes the distance between the shafts and the diameter of these shafts, if an acceptable functioning is to be obtained. This small distance between the shafts results in increased stress and strain in the shafts, ultimately leading to premature failure.

An object of the present invention is to provide an elevating truck arrangement which overcomes the prior art problem of high stress and strain by providing a multiple-shear junction arrangement in the elevating mechanism.

SUMMARY OF THE INVENTION

In accordance with the present invention, an elevating lift truck, or the like, comprises a frame which is movable upwardly and downwardly relative to its support wheels, rollers, or the like, the frame having a forwardly projecting portion which is supported on rolling means. Further provided is a means for selectively raising and lowering the forwardly projecting portion of the frame relative to the rolling means, the raising and lowering means including a fork arm carrying a rolling means and being pivotally connected to the forwardly projecting portion of the frame. A motion-transmitting mechanism is coupled to the frame and is pivotally connected to the fork arm via another pivot means in order to impart rotation to the fork arm in dependence upon movement of the frame relative to its support wheels to thereby correspondingly lift or lower the forwardly projecting portion of the frame. The pivot means for the fork arm each comprise respective multiple-shear pivot junctions in order to improve structural strength and to provide better resistance to lateral twisting of the elements.

DETAILED DESCRIPTION OF ILLUSTRATED EMBODIMENTS

The preferred embodiment of the invention concerns pallet trucks, and the detailed description is given in connection with such pallet trucks. This is illustrative only, and not limiting of the scope of the appended claims.

Figure 1:
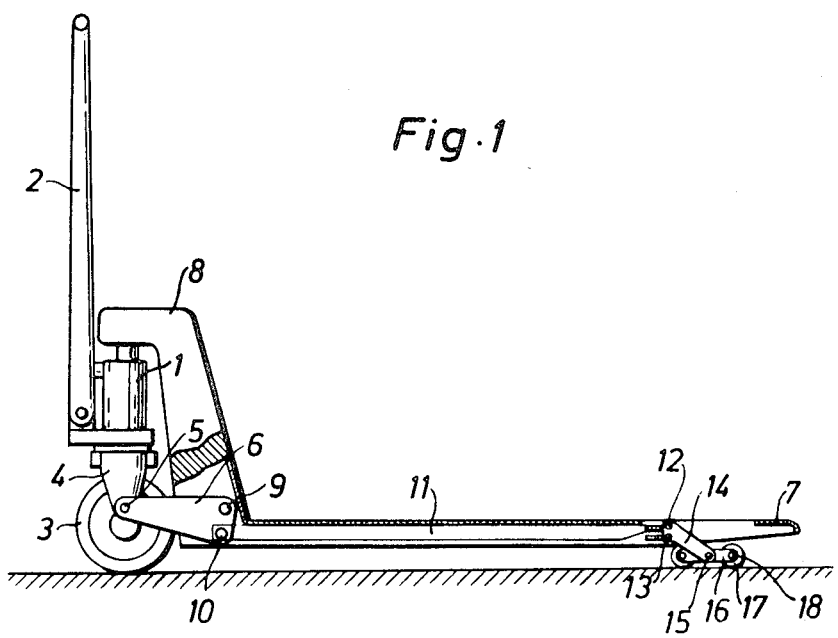
FIG. 1 is a side elevation of a pallet truck using the present invention.
Figure 2:
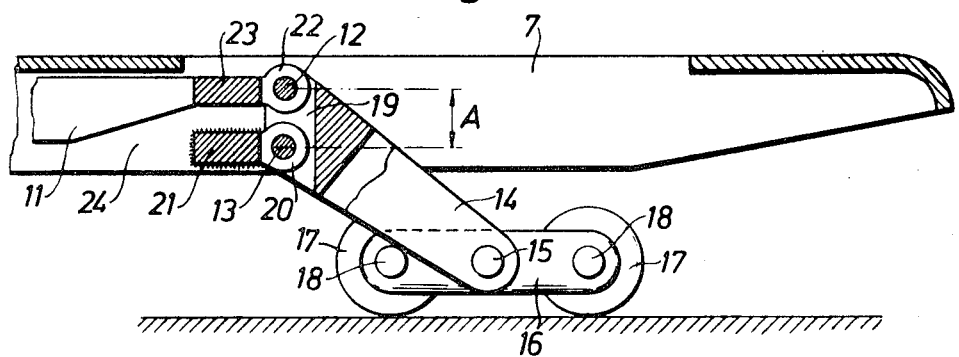
FIG. 2 is a side elevation of the front part of the truck of FIG. 1.
Figure 3:
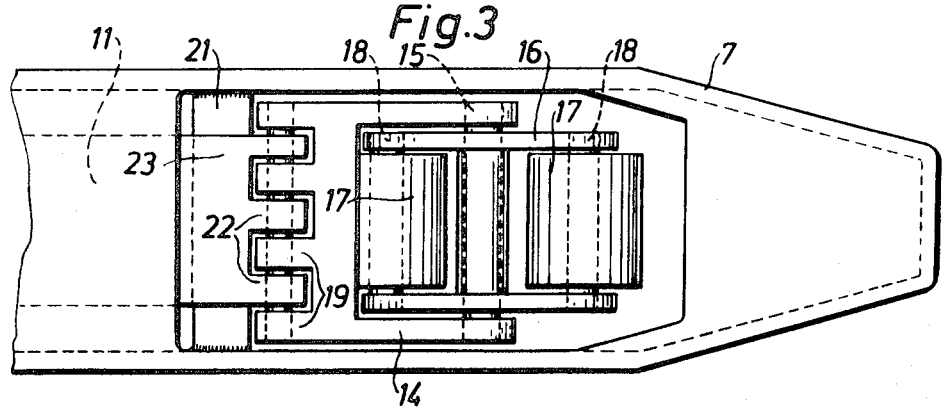
FIG. 3 is a plan view of the same parts shown in FIG. 2.

The trucks shown in FIGS. 1-3 comprises a frame 8 and two lift forks 7 rigidly connected to the frame 8. The frame 8 is movable upwards and downwards by means of a lever 2 which operates an hydraulic jack 1, around which a yoke 4 is movably cradled. The truck is carried by two steering wheels 3 and by rollers or wheels 17 at the free end of the lift forks 7. Each fork has two rollers 17; however, the number of rollers is insignificant. The shafts 18 of the rollers 17 are both connected to two cradle plates 16, which are mounted to a shaft 15 which is pivotally coupled to a fork arm 14. Fork arm 14 is coupled to a shaft pivot 13 fixed to the fork 7. Fork arm 14 is also pivotally connected to rod 11 by means of shaft 12. Rod 11 is pivotally connected to link 6 by means of shaft 10. Link 6 is pivotally connected to frame 8 by means of shaft pivot 9 which is fixed to frame 8. Link 6 is further pivotally connected to the yoke 4 by means of a shaft 5. When the jack 1 is operated by lever 2, the frame 8 is pushed upwards, the link 6 is turned counter-clockwise about pivot 9, the rod 11 is pushed towards the right side and the fork arm 14 is turned clockwise about pivot 13, pushing the rollers 17 downwards and consequently lifting the free ends of the lift forks 7. Thus, the lift forks 7 are maintained level during lifting thereof. Lowering of the forks 7 is the reverse operation.

Figure 4:
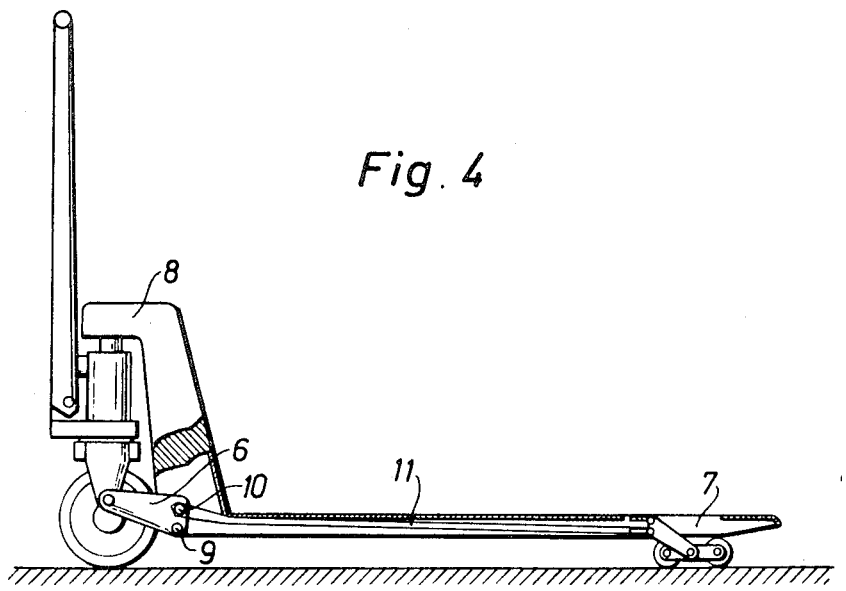
FIG. 4 is a side elevation of a similar truck as that shown in FIG. 1.
Figure 5:
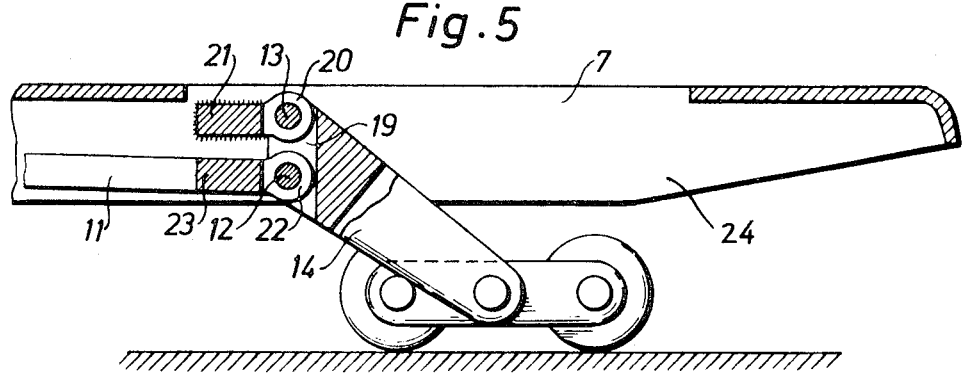
FIG. 5 is a side elevation of the front part of the truck of FIG. 4.
Figure 6:
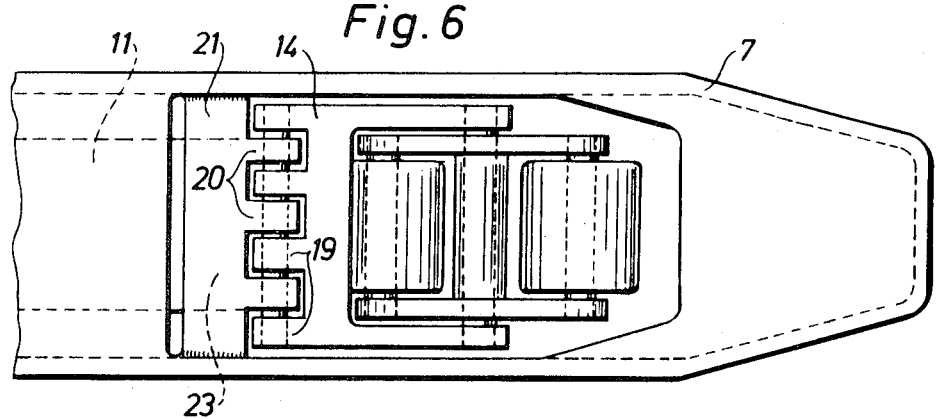
FIG. 6 is a plan view of the same parts shown in FIG. 5.

The truck in FIGS. 4, 5 and 6 is similar to the one described above in connection with FIGS. 1-3. The main difference is that the rod 11 is pulled towards the left side in order to lift the forks. This is essentially achieved by reversing the positions of pivots 9 and 10 for link 6 and of pivots 12 and 13 for fork arm 14. The operation should be apparent in view of the above discussion of the embodiment of FIGS. 1-3.

A further feature of the present invention is that the fork arms 14 are pivotally joined to the ends 23 (FIGS. 2, 3, 5 and 6) of the rods 11 and to the fixed fastening devices 21 which are fixed to the side flanges 24 of forks 7, by means of multiple shear junctions 19 and 22. This type of construction, using the interleaved, extending, pivoted elements 19, 22, helps to better distribute the loads and leads to a prolonged useful life of the mechanism. The pivot shafts 12 extend through the interleaved pivoted elements 19, 22 so as to provide better resistance to lateral twisting as well as improved shear strength.

With the present invention it has been possible to attain a very low height in the lower position of the legs. Also, the construction enables achieving the necessary and considerable height when pallets are transported over ramps, thresholds and the like.

I claim:

1. An elevating lift truck, or the like, comprising:
    a frame (8) mounted on wheels (3), said frame (8) having a forwardly projecting portion (7) supported on rolling means (17);
    means (1,2) for selectively moving said frame (8) upwardly and downwardly relative to said wheels (3); and
    means for selectively raising and lowering said forwardly projecting portion (7) of said frame (8) relative to said rolling means (17), said raising and lowering means including:
        a fork arm (14) carrying at least one rolling means (17) at one portion thereof;
        first pivot means (13) for pivotally connecting a second portion of said fork arm (14) to said forwardly projecting portion (7) of said frame (8); and
        a motion-transmitting mechanism (5,6,9,10,11,12) coupled to said frame (8) and pivotally connected (12) to said fork arm (14) via a second pivot means (12), said motion-transmitting mechanism imparting pivotal motion to said fork arm (14) about said first pivot means (13) in a direction dependent upon the direction of motion of said frame (8) relative to said wheels (3) in order to thereby correspondingly lift or lower said forwardly projecting portion (7); said first and second pivot means (12,13) each comprising respective multiple-shear pivot junctions, each multiple-shear pivot junction including:
        a pair of pivot elements, each pivot element comprising at least two extending elements (19,22) which are interleaved with the at least two extending elements of the other of its respective pair of pivot elements; and
        a pivot shaft passing through each of said interleaved extending elements.

2. A truck according to claim 1 wherein said fork arm carries said at least one rolling means at one end portion thereof, and said first and second pivot means are located at the other end portion thereof.

3. A truck according to claim 2 wherein said first pivot means is located vertically below said second pivot means.

4. A truck according to claim 2 wherein said second pivot means is located vertically below said first pivot means.

5. A truck according to claim 1 wherein said at least one rolling means is pivotally connected to said one portion of said fork arm.

6. A truck according to claim 1 wherein said at least one rolling means comprises a pair of rolling elements mounted on a frame structure, said frame structure being pivotally connected to said one portion of said fork arm.

7. A truck according to claim 1 wherein said forwardly projecting portion is an elongated, forwardly extending, fork lift element.

8. A truck according to claim 1 wherein said forwardly extending portion comprises a pair of elongated, separated, forwardly projecting fork lift elements, each of which is supported on respective rolling means, and each of which comprises respective means for selectively raising and lowering said fork lift elements relative to said respective rolling means, each of said raising and lowering means comprising said multiple-shear pivot junctions.

9. A truck according to claim 1 wherein each of said pivot elements comprises at least three extending elements (19,22) which are interleaved with the at least three extending elements to the other of its respective pair of pivot elements.

* * * * *

UNITED STATES PATENT OFFICE
CERTIFICATE OF CORRECTION

Patent No. 3,814,456            Dated June 4, 1974

Inventor(s) Anders Ivar BRYNTSE

It is certified that error appears in the above-identified patent and that said Letters Patent are hereby corrected as shown below:

Column 4, line 39, after "elements" change "to" to --of--.

Signed and sealed this 1st day of October 1974.

(SEAL)
Attest:

McCOY M. GIBSON JR.
Attesting Officer

C. MARSHALL DANN
Commissioner of Patents